United States Patent
Suzuki et al.

(10) Patent No.: US 10,994,422 B2
(45) Date of Patent: May 4, 2021

(54) ROBOT SYSTEM FOR ADJUSTING OPERATION PARAMETERS

(71) Applicant: FANUC CORPORATION, Yamanashi (JP)

(72) Inventors: Hajime Suzuki, Yamanashi (JP); Shuusuke Watanabe, Yamanashi (JP); Kaimeng Wang, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 211 days.

(21) Appl. No.: 16/201,550

(22) Filed: Nov. 27, 2018

(65) Prior Publication Data
US 2019/0184577 A1    Jun. 20, 2019

(30) Foreign Application Priority Data
Dec. 14, 2017    (JP) .............................. JP2017-239799

(51) Int. Cl.
*B25J 13/06*    (2006.01)
*G05B 19/4097*    (2006.01)
*B25J 9/16*    (2006.01)

(52) U.S. Cl.
CPC .............. *B25J 13/06* (2013.01); *B25J 9/1664* (2013.01); *G05B 19/4097* (2013.01); *G05B 2219/50391* (2013.01)

(58) Field of Classification Search
CPC ...... B25J 13/065; B25J 9/1651; B25J 9/1653; B25J 9/1671; B25J 9/1689; B25J 13/06;
(Continued)

(56) References Cited

U.S. PATENT DOCUMENTS

| 5,572,103 A * | 11/1996 | Terada | B25J 9/1656 |
| | | | 318/568.11 |
| 6,243,621 B1 * | 6/2001 | Tao | B25J 9/1694 |
| | | | 219/124.34 |

(Continued)

FOREIGN PATENT DOCUMENTS

| CN | 104875209 A | 9/2015 |
| DE | 10 2007 060 682 | 6/2009 |

(Continued)

OTHER PUBLICATIONS

Notification of Reasons for Refusal dated Oct. 29, 2019 in Japanese Patent Application No. 2017-239799.
(Continued)

*Primary Examiner* — Khoi H Tran
*Assistant Examiner* — B M M Hannan
(74) *Attorney, Agent, or Firm* — Wenderoth, Lind & Ponack, L.L.P.

(57) ABSTRACT

A robot system that performs desired processing on a processing target object using a processing tool. The robot system includes a robot having an arm tip that holds the processing tool, a position detector that detects a position of the arm tip, and a robot controller that controls an operation of the robot based on a position command and a position feedback detected by the position detector. The robot controller includes an adjustment operation creating unit that, during adjustment of operation parameters for controlling the operation of the robot, acquires an application and an operation area of the robot and automatically creates an adjustment operation corresponding to the acquired application and the operation area and a parameter adjustment unit that automatically adjusts the operation parameters during execution of the adjustment operation created by the
(Continued)

adjustment operation creating unit so that a performance required for the application is satisfied.

12 Claims, 3 Drawing Sheets

(58) Field of Classification Search
CPC ...... B25J 9/1664; B25J 9/1656; B25J 11/005; B25J 9/1692; G05B 19/40938; G05B 19/4097; G05B 2219/50391; G05B 13/024; G05B 2219/40549; G05B 2219/45104; B23K 9/007; B23K 9/28; B23K 9/32; B23K 9/0953
USPC ................ 700/245, 250, 253, 257, 262, 264
See application file for complete search history.

(56) References Cited

U.S. PATENT DOCUMENTS

| | | | | |
|---|---|---|---|---|
| 7,127,325 | B2* | 10/2006 | Nagata | B25J 9/1674 700/245 |
| 10,618,166 | B2* | 4/2020 | Kokubo | B25J 9/1697 |
| 10,780,584 | B2* | 9/2020 | Perrot | B25J 9/1689 |
| 2004/0083010 | A1* | 4/2004 | Nagata | G05B 19/4063 700/1 |
| 2005/0102060 | A1* | 5/2005 | Watanabe | B25J 9/1697 700/245 |
| 2007/0075048 | A1* | 4/2007 | Kunisaki | B25J 9/1697 219/91.1 |
| 2007/0210740 | A1* | 9/2007 | Sato | B25J 9/1633 318/646 |
| 2008/0009972 | A1* | 1/2008 | Nihei | B25J 9/1669 700/245 |
| 2008/0308533 | A1* | 12/2008 | Takahashi | B23K 11/253 219/117.1 |
| 2010/0106285 | A1* | 4/2010 | Massey | B23K 9/16 700/212 |
| 2012/0296471 | A1* | 11/2012 | Inaba | B25J 9/163 700/253 |
| 2015/0127124 | A1* | 5/2015 | Kobayashi | B25J 9/1689 700/83 |
| 2015/0246442 | A1* | 9/2015 | Cho | B25J 19/021 700/253 |
| 2018/0129187 | A1* | 5/2018 | Spieker | G05B 19/4061 |

FOREIGN PATENT DOCUMENTS

| | | |
|---|---|---|
| DE | 10 2009 049 327 | 4/2011 |
| DE | 10 2010 048 961 | 8/2011 |
| DE | 10 2012 104 194 | 11/2012 |
| DE | 10 2015 002 192 | 9/2015 |
| DE | 10 2016 012 065 | 4/2017 |
| JP | 62-35903 | 2/1987 |
| JP | 2001-22418 | 1/2001 |
| JP | 2002-287816 | 10/2002 |
| JP | 2015-163416 | 9/2015 |
| JP | 6008121 | 10/2016 |

OTHER PUBLICATIONS

Notification of Reasons for Refusal dated Jan. 8, 2020 in Japanese Patent Application No. 2017-239799.
Office Action dated Oct. 7, 2020 in DE Patent Application No. 10 2018 221 127.2.
Office Action dated Mar. 10, 2021 in CN Patent Application No. CN201811480001.5.

* cited by examiner

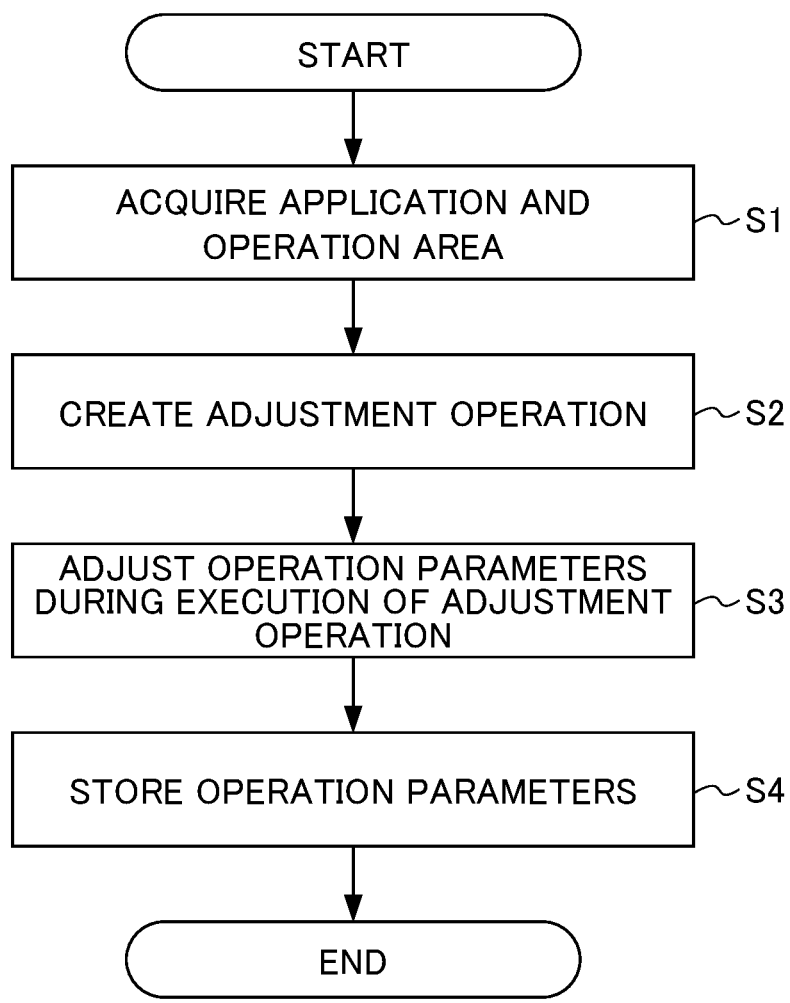

ROBOT SYSTEM FOR ADJUSTING OPERATION PARAMETERS

This application is based on and claims the benefit of priority from Japanese Patent Application No. 2017-239799, filed on 14 Dec. 2017, the content of which is incorporated herein by reference.

BACKGROUND OF THE INVENTION

Field of the Invention

The present invention relates to a robot system that performs a desired processing on a processing target object using a processing tool.

Related Art

Industrial robots are used in various applications (uses), and the performance required for industrial robots are different depending on the application. For example, for a spot welding robot, a high-accuracy positioning performance and a vibration suppression performance are required at welding points to stabilize welding quality, and a high-speed operation performance is required during air-cut (no-load shift) between welding points. On the other hand, for an arc welding robot, since welding is performed during movement as well, a performance which is enough to draw a highly accurate trajectory such that high-quality welding can be achieved is required.

A method is known in which a plurality of robot operation modes are prepared for different required performances depending on applications and an operation mode is selected depending on the required performance. For example, Patent Document 1 discloses a method in which a plurality of operation modes adjusted in advance, such as a high-speed-specific operation mode, a vibration control-specific operation mode, or the like, are prepared and the operation mode is changed depending on the required performance. In the method disclosed in Patent Document 1, when an operation mode is changed, a servo gain of a servo circuit that controls the operations of the robot is adjusted.

Patent Document 1: Japanese Patent No. 6008121

SUMMARY OF THE INVENTION

Generally, adjustment of these operation modes is performed based on the operation determined in advance by the manufacturer. However, operations used in the actual field on the user's side is different from the operation determined by the manufacturer. For example, the attitude of a robot (the angle of an arm) or the weight or the like of a tool is different. Therefore, a desired performance of the robot is not always obtained in the actual field on the user's side. Moreover, since the adjustment of these operation modes does not take applications used in the actual field on the user's side into consideration, there is a possibility that the performance of the robot cannot be sufficiently exerted vis-a-vis an operation unique to an application in the actual field on the user's side.

An object of the present invention is to provide a robot system that suppresses deterioration in performance of robots in actual applications and operations.

(1) A robot system (for example, a spot welding robot system 1A or an arc welding robot system 1B to be described later) according to the present invention is a robot system that performs desired processing (for example, spot welding or arc welding to be described later) on a processing target object (for example, a work W to be described later) using a processing tool (for example, a spot welding gun T1 or an arc welding gun T2 to be described later), including: a robot (for example, a spot welding robot 10A or an arc welding robot 10B to be described later) having an arm tip (for example, an arm tip 12 to be described later) that holds the processing tool or the processing target object; a position detector (for example, an encoder 16 to be described later) that detects a position of the arm tip; and a robot controller (for example, a robot controller 20 to be described later) that controls a relative position between the processing tool and the processing target object by controlling an operation of the robot based on a position command and a position feedback detected by the position detector, wherein the robot controller includes: an adjustment operation creating unit (for example, an adjustment operation creating unit 22 to be described later) that, during adjustment of operation parameters for controlling the operation of the robot, acquires an application of the robot and an operation area of the robot and automatically creates an adjustment operation for adjusting the operation parameters, the adjustment operation corresponding to the acquired application and the operation area; and a parameter adjustment unit (for example, a parameter adjustment unit 23 to be described later) that automatically adjusts the operation parameters during execution of the adjustment operation created by the adjustment operation creating unit so that a performance required for the application is satisfied.

(2) The robot system according to (1) may further include a storage unit (for example, a storage unit 24 to be described later) that stores, in advance, information in which the application and the operation area are correlated with the adjustment operation and the required performance, wherein the adjustment operation creating unit may determine the adjustment operation corresponding to the acquired application and operation area based on the information stored in the storage unit, and the parameter adjustment unit may determine the required performance corresponding to the acquired application based on the information stored in the storage unit.

(3) In the robot system according to (1) or (2), the operation parameters may include at least one of a servo gain and an acceleration/deceleration time constant.

(4) In the robot system according to any one of (1) to (3), the required performance may include at least one of an operation speed, a positioning accuracy, and a trajectory accuracy.

(5) The robot system according to any one of (1) to (3) may further include an acceleration sensor (for example, an acceleration sensor 18 to be described later) provided on the arm tip to detect vibration of the arm tip, the robot controller may control the operation of the robot based on the position command, the position feedback, and the vibration detected by the acceleration sensor, and the required performance includes at least one of an operation speed, a positioning accuracy, and a vibration suppression accuracy.

(6) In the robot system according to any one of (1) to (5), the adjustment operation creating unit may acquire the operation area from CAD data created in advance.

According to the present invention, it is possible to provide a robot system that suppresses deterioration in performance of robots in actual applications and operations.

BRIEF DESCRIPTION OF THE DRAWINGS

FIG. 3 is a flowchart of an operation parameter adjustment operation of a robot controller of the robot system according to the present embodiment.

DETAILED DESCRIPTION OF THE INVENTION

Figure 1A:
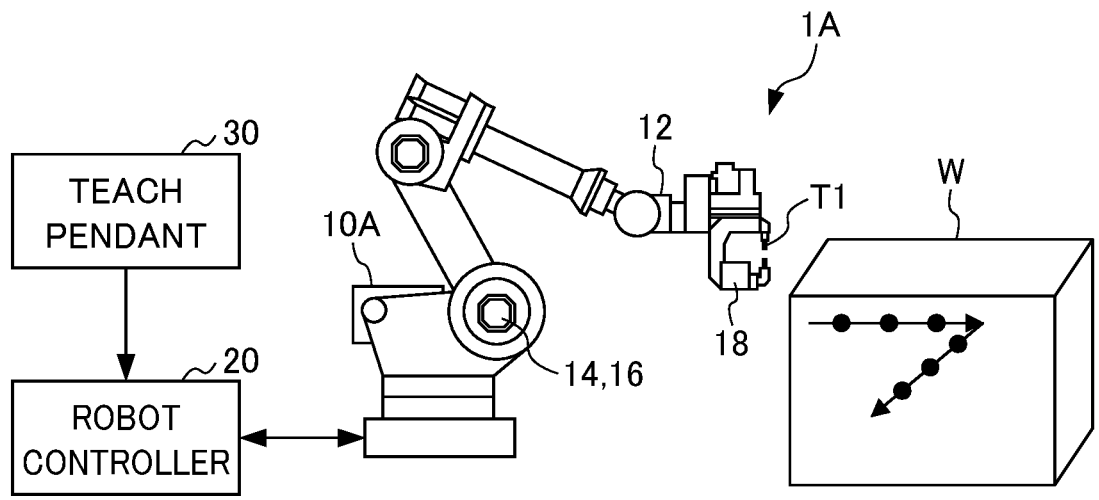
FIG. 1A is a diagram illustrating a configuration of robot system (for spot welding applications) according to the present embodiment.

Hereinafter, an example of an embodiment of the present invention will be described with reference to the accompanying drawings. The same or corresponding portions in the respective drawings will be denoted by the same reference numerals.
(Robot System)

Figure 1B:
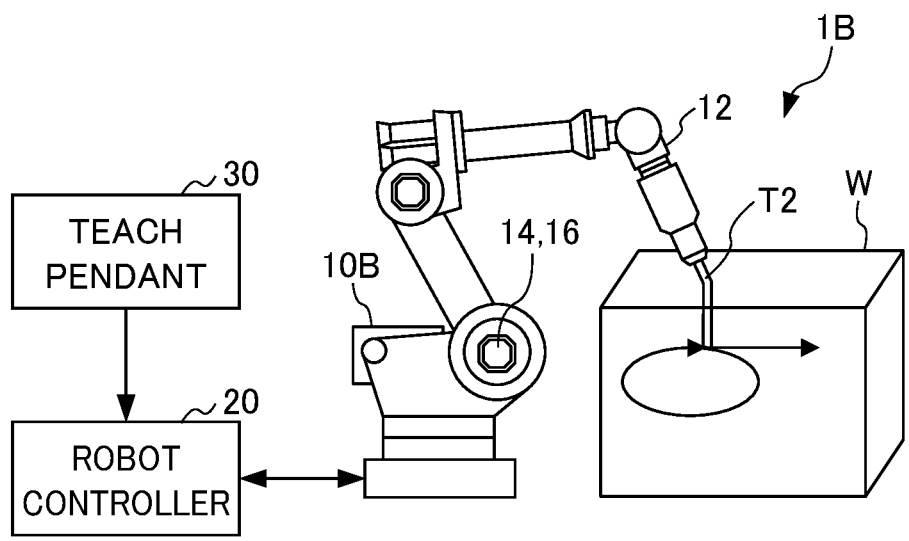
FIG. 1B is a diagram illustrating a configuration of another robot system (for arc welding applications) according to the present embodiment.

A robot system according to the present embodiment is used in various applications (uses). FIG. 1A is a diagram illustrating a configuration of a robot system according to the present embodiment used for spot welding applications. FIG. 1B is a diagram illustrating a configuration of a robot system according to the present embodiment used for arc welding applications. A robot system 1A illustrated in FIG. 1A moves a tool (a spot welding gun) T1 and a work N relative to each other using a robot 10A and performs spot welding on the work W using the tool T1. A robot system 1B illustrated in FIG. 1B moves a tool (an arc welding gun) T2 and a work W relative to each other using a robot 10B and performs arc welding on the work W using the tool T2.

The robot system 1A illustrated in FIG. 1A includes the robot 10A, the tool (a spot welding gun) T1, a robot controller 20, and a teach pendant 30. The robot system 1B illustrated in FIG. 1B includes the robot 10B, the tool (an arc welding gun) T2, the robot controller 20, and the teach pendant 30.

The robots 10A and 10B are articulated robots such as 6-axis vertical articulated robots or 4-axis vertical articulated robots. The tools T1 and T2 are attached to the arm tips 12 of the robots 10A and 10B, respectively. The robots 10A and 10B each have a plurality of servo motors 14 for driving a plurality of driving axes (only one servo motor is shown in FIGS. 1A and 1B for the sake of convenience). The servo motor 14 is subjected to driving control by the robot controller 20, and the positions and the attitudes of the robots 10A and 10B as well as those of the tools T1 and T2 are controlled by the driving control of the servo motor 14.

The tool (the spot welding gun) T1 has electrodes for spot welding. The tool T1 performs spot welding of the work W under the control of the robot controller 20. The tool (arc welding gun) T2 has an electrode for arc welding. The tool T2 performs arc welding of the work W under the control of the robot controller 20.

An encoder 16 is provided in each servo motor 14. The encoder 16 detects the position of the arm tip 12 of the robot 10A or 10B, that is, the position of the tool T1 or T2, by detecting a rotation angle about the axis of the servo motor 14. The detected position is used as a position feedback.

As illustrated in FIG. 1A, an acceleration sensor 18 may be provided on the tool T1, that is, the arm tip 12 of the robot 10A. The acceleration sensor 18 detects vibration of the tool T1, that is, vibration of the arm tip 12.

The robot controller 20 stores operation parameters, teaching data, and the like for controlling the operations of the robots 10A and 10B. The operation parameters include an acceleration/deceleration time constant of an acceleration/deceleration operation, a servo gain (for example, a potential gain), and the like. In the case of the spot welding robot 10A illustrated in FIG. 1A, the teaching data includes welding point data which is the positions and the attitudes of the robot 10A and the tool T1 when spot welding is performed on the work W at a number of welding positions. In the case of the arc welding robot 10B illustrated in FIG. 1B, the teaching data includes trajectory data which is the positions and the attitudes of the robot 10B and the tool T2 when arc welding is performed on the work W along a trajectory such as an arc or a straight line. The robot controller 20 creates an operation program for controlling the operations of the robot 10A or 10B based on these operation parameters and teaching data. The robot controller 20, by controlling the operation of the robot 10A or 10B based on a position command based on the operation program and the position feedback from the encoder 16, controls the position and attitude of the robot 10A or 10B as well as the position and attitude of the tool T1 or T2, and thus controls the relative position of the work W and the tool T1 or T1. The details of the robot controller 20 will be described later.

The teach pendant 30 is an operation board which allows an operator to input operation parameters, teaching data, and an application, an operation area, and the like of the robot 10A or 10B to be described later.
(Robot Controller)

Figure 2:
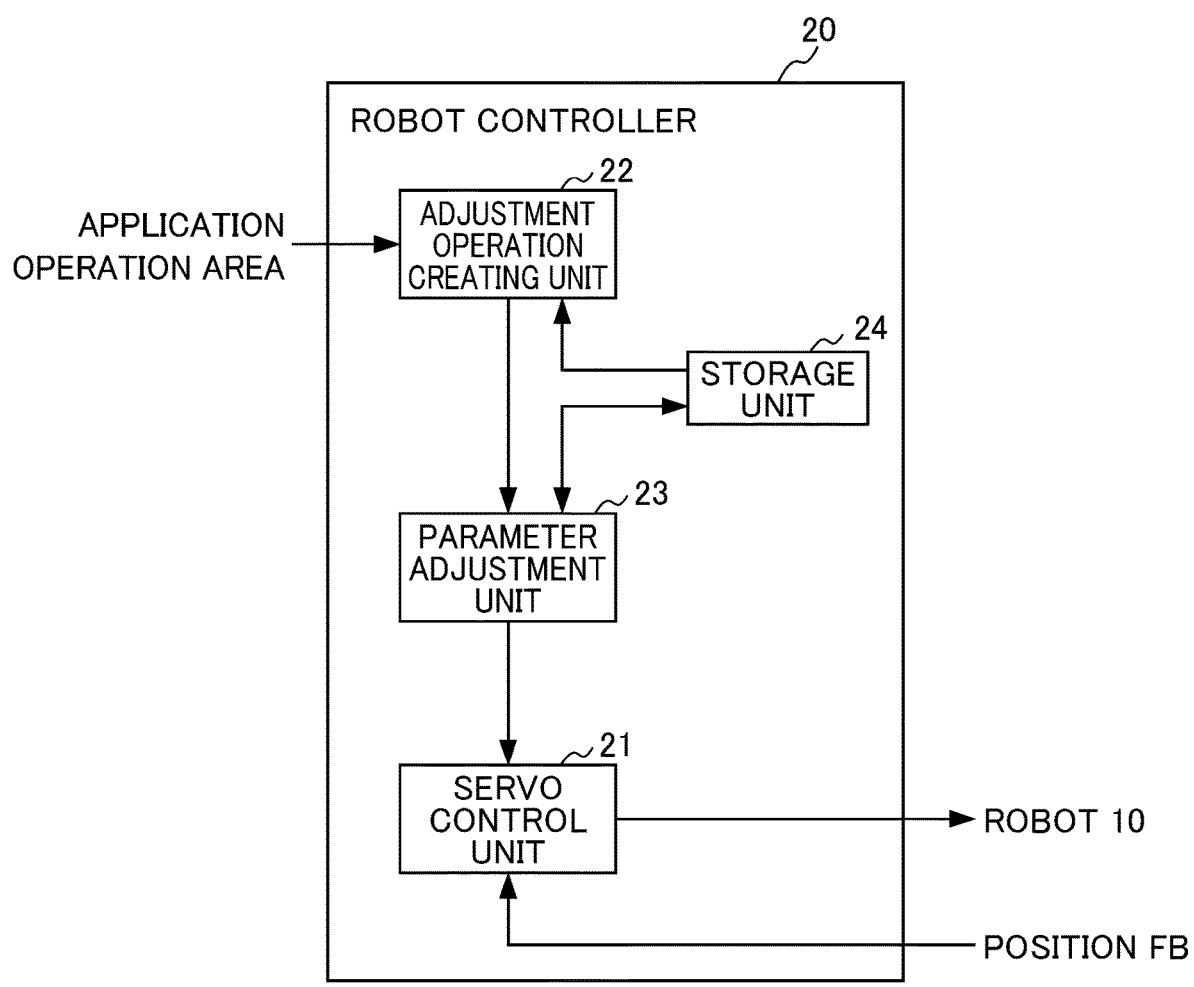
FIG. 2 is a diagram illustrating a main configuration of the robot controller, illustrated in FIG. 1A and 1B, according to the present embodiment.

FIG. 2 is a diagram illustrating a main configuration of the robot controller 20 according to the present embodiment. The robot controller 20 illustrated in FIG. 2 includes a servo control unit 21, an adjustment operation creating unit 22, a parameter adjustment unit 23, and a storage unit 24.

The servo control unit 21 generates a drive current for subjecting the servo motor 14 of the robot 10A or 10B to driving control based on a position error between the position command based on the operation program stored in the storage unit 24 and the position feedback (position FB) from the encoder 16, and thus controls the operation of the robot 10A or 10B.

Here, as described above, although the operation program is created based on the operation parameters and the teaching data, these operation parameters need to be adjusted when the robot system 1A or 1B is introduced. Generally, adjustment of operation parameters is performed based on the operation determined in advance by the manufacturer. However, operations used in an actual field on the user's side is different from the operation determined by the manufacturer. For example, the attitude of the robot 10A or 10B or the weight or the like of the tool T1 or T2 is different. Therefore, a desired performance of the robot 10A or 10B is not always obtained in an actual field on the user's side. Therefore, the present embodiment provides a robot system capable of performing adjustment of operation parameters based on operations used in the actual field on the user's side.

When adjusting operation parameters, the adjustment operation creating unit 22 acquires the application of the robot 10A or 10B as well as the operation area of the robot 10A or 10B which are input by an operator via the teach pendant 30, and automatically creates an adjustment operation corresponding to the acquired application and operation area. The application is information on the use such as spot welding, arc welding, or the like. The operation area is information on the operation area of the robot 10A or 10B during actual machining (desired processing). That is, the operation area is information on the attitude of the robot 10A or 10B during actual machining. The operation area may be information read from CAD data created in advance. The adjustment operation is an operation executed when adjusting operation parameters. For example, in the case of spot welding, the adjustment operation may be a short-pitch spot welding operation which is a typical operation of the spot welding robot 10A. On the other hand, for example, in the case of arc welding, the adjustment operation is an arc or linear operation which is a typical operation of the arc welding robot 10B.

For example, the adjustment operation creating unit 22 may determine an adjustment operation corresponding to the acquired application and operation area based on a table, stored in advance in the storage unit 24, in which an application and an operation area are correlated with an adjustment operation.

The parameter adjustment unit 23 automatically adjusts operation parameters of the robot during execution of the adjustment operation by the servo control unit 21 so that the performance required for the application is satisfied. At this time, the parameter adjustment unit 23 may determine the required performance corresponding to the acquired application based on a table, stored in advance in the storage unit 24, in which the application are correlated with the required performance.

For example, in the spot welding robot 10A, a high-speed operation performance is required between welding points, and a highly accurate positioning accuracy performance and a vibration suppression accuracy performance are required at welding points to stabilize welding quality. Therefore, the parameter adjustment unit 23 adjusts operation parameters such as an acceleration/deceleration time constant of an acceleration/deceleration operation, a servo gain (for example, a potential gain), and the like in a comprehensive manner.

Specifically, the parameter adjustment unit 23 adjust operation parameters, such as an acceleration/deceleration time constant of an acceleration/deceleration operation, so that a cycle time is shortened between welding points. Moreover, the parameter adjustment unit 23 adjusts operation parameters, such as a servo gain (for example, a potential gain), so that a position error between a position command and a position feedback is reduced at welding points. Furthermore, the parameter adjustment unit 23 may adjust operation parameters such as a deceleration time constant of a deceleration operation between welding points in order to increase positioning accuracy. Furthermore, the parameter adjustment unit 23 adjusts operation parameters, such as a servo gain (for example, a potential gain) and a deceleration time constant of a deceleration operation, based on vibration of the tool T1 detected by the acceleration sensor 18 at a welding point, that is, vibration of the arm tip 12 of the robot 10A, so that vibration decreases.

In this way, the operation area of the robot 10A during actual machining, that is, an operation parameter corresponding to the attitude of the robot 10A and the weight and the like of the tool T1 during actual machining, is obtained.

On the other hand, for example, in the arc welding robot 10B, since welding is performed during movement as well, a high trajectory accuracy performance is required to stabilize the welding quality. Therefore, the parameter adjustment unit 23 adjusts operation parameters such as an acceleration/deceleration time constant of an acceleration/deceleration operation, a servo gain (for example, a potential gain), and the like in a comprehensive manner.

Specifically, the parameter adjustment unit 23 adjusts operation parameters, such as a servo gain (for example, a potential gain), so that a position error between the position command and the position feedback is reduced. Moreover, the parameter adjustment unit 23 may adjust operation parameters such as an acceleration/deceleration time constant of an acceleration/deceleration operation to enhance trajectory control accuracy.

In this way, the operation area of the robot 10B during actual machining, that is, an operation parameter corresponding to the attitude of the robot 10B during actual machining and the weight and the like of the tool T2, is obtained.

The parameter adjustment unit 23 stores the adjusted operation parameters in the storage unit 24. For example, the parameter adjustment unit 23 updates the operation parameters stored in the storage unit 24 to the adjusted operation parameters.

The storage unit 24 stores a table in which an application and an operation area are correlated with an adjustment operation and a required performance. Moreover, the storage unit 24 stores the latest operation parameters adjusted by the parameter adjustment unit 23. Moreover, the storage unit 24 stores an operation program, teaching data, and the like. The storage unit 24 is a rewritable memory such as EEPROM and the like.

The robot controller 20 (excluding the storage unit 24) is comprised of an arithmetic processor such as a digital signal processor (DSP), a field-programmable gate array (FPGA), or the like. Various functions of the robot controller 20 (excluding the storage unit 24) are realized by executing predetermined software (program, application) stored, for example, in the storage unit 24. Various functions of the robot controller 20 (excluding the storage unit 24) may be realized by cooperation of hardware and software or may be realized by hardware (electronic circuits) only.

Next, an operation parameter adjustment operation of the robot controller 20 in the robot system 1A or 1B according to the present embodiment will be described with reference to FIG. 3. FIG. 3 is a flowchart of an operation parameter adjustment operation of the robot controller in the robot system 1A or 1B according to the present embodiment. First, when a robot is delivered from the manufacturer and is installed in the actual field on the user's side, an operator inputs initial values (before adjustment) of operation parameters, teaching data, and the like, which correspond to applications, such as a spot welding application or an arc welding application, via the teach pendant. Then, the operator inputs the application of the robot 10A or 10B and the operation area of the robot 10A or 10B during actual machining.

(In the Case of Spot welding Robot System 1A)

For example, in the case of the spot welding robot system 1A, the adjustment operation creating unit 22 acquires the application of the robot 10A and the operation area of the robot 10A during actual machining (S1). The adjustment operation creating unit 22 automatically creates an adjustment operation corresponding to the acquired application and operation area based on the table, stored in advance in the storage unit 24, in which an application and an operation area are correlated with an adjustment operation (S2). For example, the adjustment operation creating unit 22 creates, as the adjustment operation, a short-pitch spot welding operation which is a typical operation of the spot welding robot 10A.

Subsequently, the servo control unit 21 executes an adjustment operation of the robot 10A based on a position error between the position command and the position feedback based on the adjustment operation created by the adjustment operation creating unit 22. At this time, the parameter adjustment unit 23 adjusts operation parameters such as an acceleration/deceleration time constant of an acceleration/deceleration operation or a servo gain (for example, a potential gain) in a comprehensive manner (S3). Specifically, the parameter adjustment unit 23 adjusts operation parameters, such as an acceleration/deceleration time constant of an acceleration/deceleration operation, so that the cycle time is shortened between welding points. Moreover, the parameter adjustment unit 23 adjusts operation parameters, such as a servo gain (for example, a potential gain), so that a position error between a position command and a position feedback is reduced at welding points. Furthermore, the parameter adjustment unit 23 may adjust operation parameters such as a deceleration time constant of a deceleration operation between welding points in order to increase positioning accuracy. Furthermore, the parameter adjustment unit 23 adjusts operation parameters, such as a servo gain (for example, a potential gain) and a deceleration time constant of a deceleration operation, based on vibration of the tool T1 detected by the acceleration sensor 18 at a welding point, that is, vibration of the arm tip 12 of the robot 10A, so that vibration decreases. In this way, the operation area of the robot 10A during actual machining, that is, an operation parameter corresponding to the attitude of the robot 10A and the weight and the like of the tool T1 during actual machining, is obtained.

The parameter adjustment unit 23 stores the adjusted operation parameters in the storage unit 24 (S4). For example, the parameter adjustment unit 23 updates the operation parameters stored in the storage unit 24 to the adjusted operation parameters.

(In the Case of Arc Welding Robot System 1B)

For example, in the case of the arc welding robot system 1B, the adjustment operation creating unit 22 acquires an application of the robot 10B and the operation area of the robot 10B during actual machining (S1). The adjustment operation creating unit 22 automatically creates an adjustment operation corresponding to the acquired application and operation area based on the table, stored in advance in the storage unit 24, in which an application and an operation area are correlated with an adjustment operation (S2). For example, the adjustment operation creating unit 22 creates, as the adjustment operation, an arc or linear operation which is a typical operation of the arc welding robot 10B.

Subsequently, the servo control unit 21 executes an adjustment operation of the robot 10B based on a position error between the position command and the position feedback based on the adjustment operation created by the adjustment operation creating unit 22. At this time, the parameter adjustment unit 23 adjusts operation parameters such as an acceleration/deceleration time constant of an acceleration/deceleration operation or a servo gain (for example, a potential gain) in a comprehensive manner (S3). Specifically, the parameter adjustment unit 23 adjusts operation parameters, such as a servo gain (for example, a potential gain), so that a position error between a position command and a position feedback is reduced. Furthermore, the parameter adjustment unit 23 may adjust operation parameters such as an acceleration/deceleration time constant of an acceleration/deceleration operation between welding points in order to increase trajectory control accuracy. In this way, the operation area of the robot 10B during actual machining, that is, an operation parameter corresponding to the attitude of the robot 10B during actual machining and the weight and the like of the tool T2, is obtained.

The parameter adjustment unit 23 stores the adjusted operation parameters in the storage unit 24 (S4). For example, the parameter adjustment unit 23 updates the operation parameters stored in the storage unit 24 to the adjusted operation parameters.

As described above, according to the robot system 1A or 1B of the present embodiment, when an application (use) and an operation area of the robot 10A or 10B are input, the adjustment operation creating unit 22 automatically creates an adjustment operation corresponding to the application and the operation area, and during execution of this adjustment operation, the parameter adjustment unit 23 automatically adjusts operation parameters so that a performance required for the application is satisfied. In this way, in the actual field on the user's side, it is possible to perform adjustment of operation parameters corresponding to an actual application (use) and the actual operation area (that is, the actual attitude of the robot 10A or 10B, the weight of the tool, and the like). Therefore, it is possible to suppress deterioration in performance of the robot 10A or 10B in applications and operations in the actual field on the user's side.

While an embodiment of the present invention has been described so far, the present invention can be changed and modified in various ways without being limited to the above-described embodiment. For example, in the above-described embodiment, the robot system 1A or 1B in which the work W is fixedly installed, the tool T1 or T2 is attached to the arm tip 12 of the robot 10A or 10B, and the tool T1 or T2 is moved relative to the work 1 has been illustrated. However, the feature of the present invention is not limited thereto, and can be applied to a robot system in which a tool fixedly installed and a work is held at an arm tip of a robot, thereby moving the tool relative to the work.

In the above-described embodiment, the spot welding robot system 1A and the arc welding robot system 1B have been illustrated. However, the feature of the present invention is not limited thereto but can be applied to robot control of various robot systems that perform desired processing on a processing target object. For instance, a press to press handling robot system is an example of a robot system which values a high-speed operation performance and a high-accuracy positioning performance like the spot welding robot system 1A. Alternatively, a sealing robot system is an example of a robot system which values a high-accuracy trajectory control performance like the arc welding robot system 1B.

In the above-described embodiment, the encoder 16 has been illustrated as a position detector that detects the position of the tool T1 or T2, that is, the position of the arm tip 12 of the robot 10A or 10B. However, the position detector is not limited thereto and may be a position sensor provided in the tool T1 or T2, that is, the arm tip 12 of the robot 10A or 10B. At this time, the position detected by the position sensor is used as a position feedback.

EXPLANATION OF REFERENCE NUMERALS

1A: Spot welding robot system
1B: Arc welding robot system
10A: Spot welding robot
10B: Arc welding robot
12: Arm tip
14: Servo motor
16: Encoder (Position detector)
18: Acceleration sensor
20: Robot controller 21: Servo control unit
22: Adjustment operation creating unit
23: Parameter adjustment unit
24: Storage unit
30: Teach pendant
T1: Spot welding gun (Processing tool)
T2: Arc welding gun (Processing tool)
W: Work (Processing target object)

What is claimed is:

1. A robot system that performs desired processing on a processing target object using a processing tool, comprising:
   a robot having an arm tip that holds the processing tool or the processing target object;
   a position detector that detects a position of the arm tip; and
   a robot controller that controls a relative position between the processing tool and the processing target object by controlling an operation of the robot based on a position command and a position feedback detected by the position detector, wherein
   the robot controller includes:
   a memory configured to store a program; and
   a processor configured to execute the program and control the robot controller to:
   during adjustment of operation parameters for controlling the operation of the robot, acquire an application of the robot and an operation area of the robot and automatically create an adjustment operation for adjusting the operation parameters, the adjustment operation corresponding to the acquired application and the operation area; and
   automatically adjust the operation parameters during execution of the adjustment operation created so that a required performance which is required for the application is satisfied.

2. The robot system according to claim 1, the memory stores, in advance, information in which the application and the operation area are correlated with the adjustment operation and the required performance, wherein
   the processor is further configured to execute the program and control the robot controller to determine the adjustment operation corresponding to the acquired application and the operation area based on the information stored in the memory, and
   determine the required performance corresponding to the acquired application based on the information stored in the memory.

3. The robot system according to claim 1, wherein the operation parameters include at least one of a servo gain and an acceleration time constant or a deceleration time constant.

4. The robot system according to claim 1, wherein the required performance includes at least one of an operation speed, a positioning accuracy, and a trajectory accuracy.

5. The robot system according to claim 1, further comprising: an acceleration sensor provided in the arm tip to detect vibration of the arm tip, wherein
   the robot controller controls the operation of the robot based on the position command, the position feedback, and the vibration detected by the acceleration sensor, and
   the required performance includes at least one of an operation speed, a positioning accuracy, and a vibration suppression accuracy.

6. The robot system according to claim 1, wherein the processor is further configured to execute the program and control the robot controller to acquire the operation area from Computer Aided Design (CAD) data created in advance.

7. The robot system according to claim 1, wherein the operation area is information on an attitude of the robot during actual machining of the desired processing.

8. The robot system according to claim 1, wherein the operation area is information on an attitude of the robot during actual machining of the desired processing, and the attitude of the robot is an angle of a robot arm or the weight of the processing tool.

9. The robot system according to claim 1, wherein the operation parameters are adjusted so that a position error between the position command and the position feedback detected by the position detector is reduced.

10. The robot system according to claim 1, wherein the application is information on the use such as spot welding or arc welding.

11. The robot system according to claim 1, wherein the adjustment operation is an operation used in an actual field on a user's side, the operation being different from an operation determined in advance by a manufacturer.

12. The robot system according to claim 1, wherein in a case of spot welding, the adjustment operation is a short-pitch spot welding operation which is a typical operation of a spot welding robot, and in the case of arc welding, the adjustment operation is an arc or linear operation which is a typical operation of an arc welding robot.

* * * * *